United States Patent [19]

Rogers

[11] Patent Number: 4,896,450
[45] Date of Patent: Jan. 30, 1990

[54] SPEAR GUN TIP ASSEMBLY

[75] Inventor: William H. Rogers, Jacksonville, Fla.

[73] Assignee: Sea Search, Inc., South Jacksonville, Fla.

[21] Appl. No.: 211,759

[22] Filed: Jun. 27, 1988

Related U.S. Application Data

[63] Continuation-in-part of Ser. No. 72,297, Jul. 13, 1987, abandoned, and Ser. No. 171,018, Mar. 21, 1988, Pat. No. 4,839,979.

[51] Int. Cl.$^4$ ............................................. A01K 81/00
[52] U.S. Cl. ......................................................... 43/6
[58] Field of Search .................. 43/6; 297/61; 273/419

[56] References Cited

U.S. PATENT DOCUMENTS

| | | | |
|---|---|---|---|
| 3,164,385 | 1/1965 | Shure | 273/419 |
| 3,945,642 | 3/1976 | Henthorn | 43/6 |
| 4,807,382 | 2/1989 | Albrecbt | 43/6 |

*Primary Examiner*—M. Jordan
*Attorney, Agent, or Firm*—Arthur G. Yeager; Earl L. Tyner

[57] ABSTRACT

An underwater spear assembly, including a shaft and a detachable sharpened tip, and an extension tip which is slidably attachable to the sharpened tip, a flexible cable attached between the extension tip and a releasable clamp slidably mounted on the shaft and which cable can be readily detached from the clamp to remove the spear tip assembly from a fish by pulling the free end of the cable through a hole in a fish made by the spear assembly. The clamp includes a 45° angled inclined portion which provides a bending of the cable and the required tension on the cable to inhibit the tip from falling off the spear during firing thereof from a spear gun. The clamp includes a compression spring between the inclined portion and the sleeve so that the cable stop may be released upon movement of the inclined portion away from a passageway through a lateral flange of the sleeve.

20 Claims, 2 Drawing Sheets

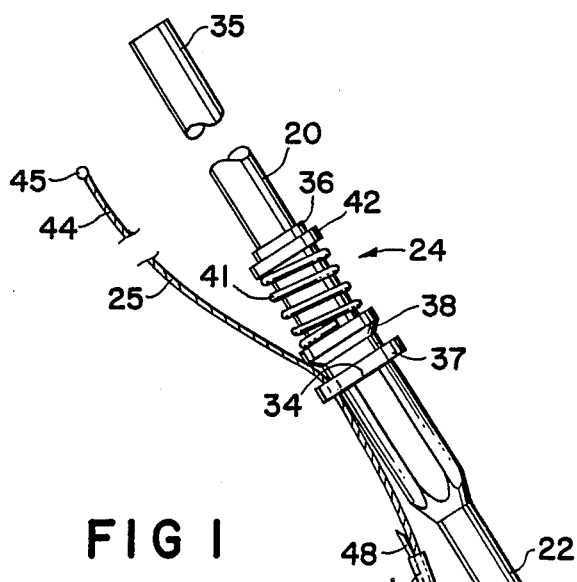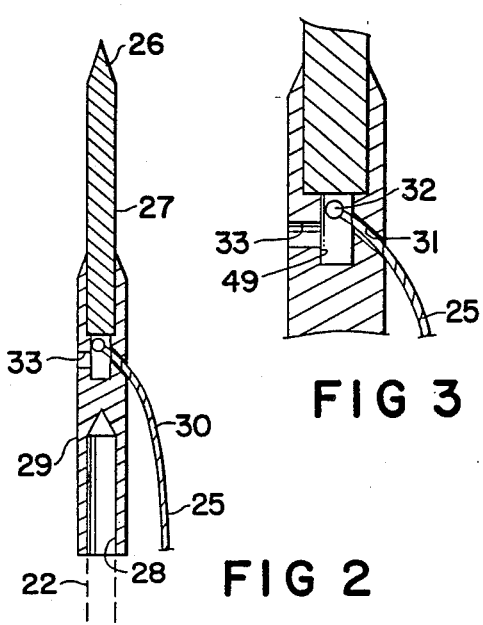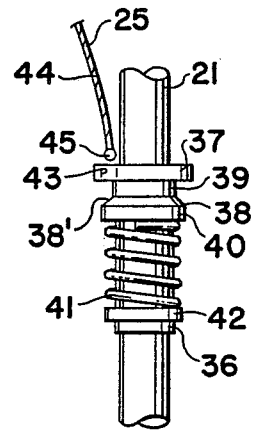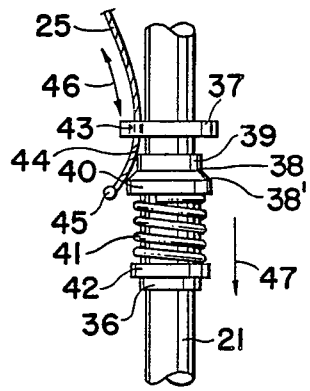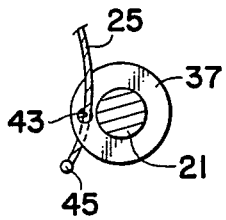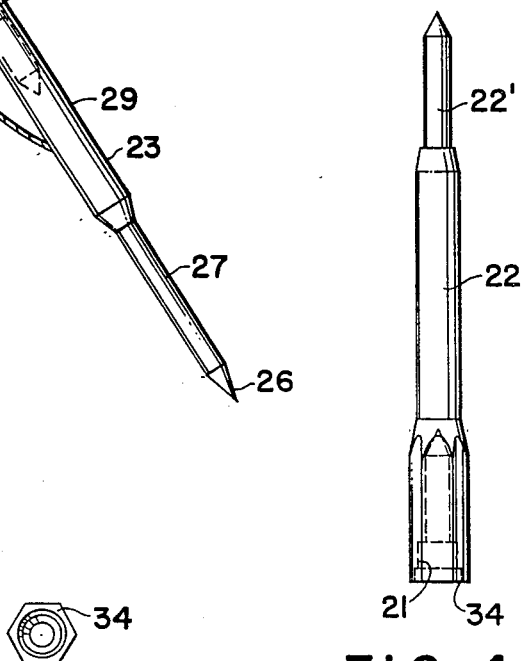

4,896,450

SPEAR GUN TIP ASSEMBLY

RELATED PATENT APPLICATIONS

This is a continuation-in-part application of copending patent application U.S. Ser. No. 072,297, filed July 13, 1987, abandoned 11/4/88 and U.S. Ser. No. 171,018, filed Mar. 21, 1988, issued 6/20/89 U.S. Pat. No. 4,839,979, by William H. Rogers.

BACKGROUND OF THE INVENTION

Spear gun fishing by underwater divers involves the use of a gun that propels a spear towards a fish. When the spear pierces the fish, the fish usually flips and turns through violent contortions to free itself of the spear. Unless the spear tip is fashioned with devices to prevent it from being retracted from the fish, the spear may be shaken loose by the contortions of the fish and the catch is lost. Spear tips of the prior art included some type of barb which was broader at its base than near the point so that reverse movement of the barb is inhibited. One type of prior art spear tip incorporates two pivotable wings which collapse against the shaft as the spear point passes through the fish, but which pivot outwardly upon any reverse movement of the shaft to allegedly prevent retraction of the spear point through the same hole it entered. This tip is removable from the spear shaft by unscrewing the screw thread connection between the tip and shaft so as to recover the shaft and tip from the fish. A second type of prior art spear tip included a tip with a flared base to prevent its retraction through the entry hole. The spear, however, could be detached from the spear point by merely pulling the two portions apart as by a fish pulling against the tip. The two portions are connected by a length of cord so as not to lose either portion. Neither of thse types of spear tips are completely satisfactory because they are not easily recovered from the fish and the tips have to be fed back through the hole in the fish. Also, often the hole in the fish "wallows" out and often the tip feeds itself back into the hole and the fish is lost and/or tip becomes lodged laterally within the fish making it difficult to remove without materially damaging the fish.

In parent applications Ser. Nos. 072,297 and 171,018 cited above, there are disclosed two alternative designs of spear tip assemblies that can be slidably attached to the forward end of the shaft of a spear, the tip assembly being removable after spearing a fish and can be replaced by a second such tip assembly or the original tip assembly can be removed from the speared fish and reused.

It is an object of this invention to provide still another improved tip assembly for a spear shaft used in underwater fishing. It is another object of this invention to provide an extension tip assembly to be used with an improved type of spear tip, which is easily assembled and readily removed from the fish for reassembly. Still other objects are to provide a tip assembly which alleviates the aforementioned problems of the prior art as will become apparent from the more detailed description which follows.

BRIEF SUMMARY OF THE INVENTION

This invention relates to an extension tip assembly to be attached to an underwater fishing spear shaft comprising a sharpened tip attached to the forward end of the spear shaft, the extension tip member being slidably removable and supported by the sharpened tip of the spear, and an elongated flexible cable having a rearward end attached to a clamping means slidably mounted n the spear shaft and a forward end portion attached to the extension tip member. The selectively releasable clamping means releasably attaches the cable to the clamping means and maintains the extension tip member on the sharpened tip during firing of the spear shaft by a spear gun. The extension tip member has a forward end sharpened to a point and a rearward end with a recess therein adapted to slidably receive the sharpened tip of the spear. The forward end of the flexible cable is atached to the mid-portion of the extension tip member.

In specific embodiments of this invention there is a rearwardly facing barb on the flexible cable to cause the shaft member to be pulled away from the tip member by the barb engaging the far side of a fish. Also, the clamping means which selectively attaches the flexible cable to the spear shaft is readily releaseable so that the extension tip member and the attached cable can be easily pulled from the far side of fish to make the extension tip member available for reuse.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may be understood by reference to the following description taken in connection with the accompanying drawings in which:

FIG. 1 is a front elevational view of the spear tip assembly of this invention;

FIG. 2 is a cross sectional view of the extension tip member of this invention;

FIG. 3 is an enlarged partial cross sectional view similar to FIG. 2 more clearly depicting the cable attached to the tip;

FIG. 4 is an enlarged front elevational view of the prior art spear tip;

FIG. 5 is a bottom plan view of the spear tip of FIG. 4;

FIG. 6 is an enlarged elevational view of the clamping means of this invention and its relationship to the flexible cable;

FIG. 7 is a view similar to that of FIG. 6, showing how the cable is attached to the clamping means;

FIG. 8 is a top plan view of the assembly of FIG. 7;

DETAILED DESCRIPTION OF THE INVENTION

Figure 9:
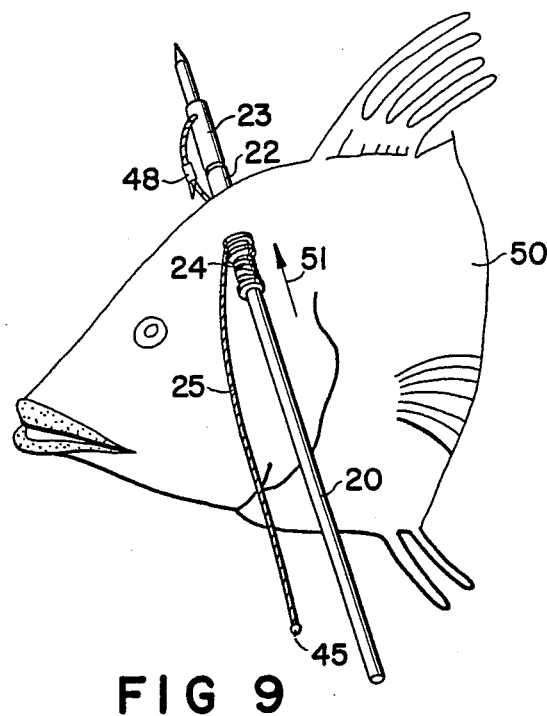
FIG. 9 is a schematic illustration of a fish speared by the assembly of this invention.
Figure 10:
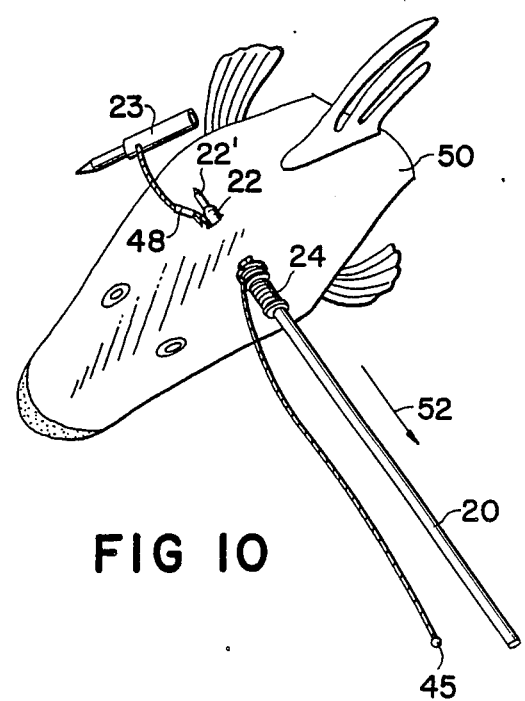
FIG. 10 is a schematic illustration of the extension tip assembly being freed from the spear and turned to engage the fish.

The invention is best understood by reference to the attached drawings wherein FIGS. 1-8 show the details of the spear tip assembly of this invention; and FIGS. 9-12 illustrate how the assembly is used in spear gun fishing.

The spear tip assembly of this invention includes three portions which are attached and detached from a prior art spear shaft 20 used in underwater fishing. The spear shaft 20 would normally have a removable tip thereon which has a diameter equal to the diameter of the shaft 20. An improved sharpened tip member 22 is attached to the forward end of the shaft 20 by screw threads or other coupling means 21. The extension tip portion 23 is slidably telescopically connected to tip member 22; a releasable clamping means 24 is slidably mounted on spear 20 and butts against shoulder 34 of tip member 22; and a flexible cable 25 is attached to both extension tip portion 23 and clamping means 24. Extension tip 23 includes a sharpened point 26 at its forward end 27 and a cup shaped recess 28 at its rearward end 29. Flexible cable 25 is attached at its forward end 30 to extension tip portion 23 by being inserted through a small preferably inclined passageway 31, and pushed outwardly of passageway 33 so that a ball stop 32 can be formed thereon by melting the end 30 of cable 25 in an inert gas atmosphere. Ball stop 32 will readily pass through larger passageway 33, but is too large to pass through passageway 31, thus anchoring cable 25 to extension tip portion 23, as clearly seen in FIGS. 2 and 3. Cable 25 is attached generally midway between forward end 27 and rearward end 29 of tip portion 23, as seen in FIGS. 1 and 2.

Tip member 22 of spear 20 slides into and out of recess 28 in rearward end 29 of extension tip portion 23. At shoulder 34 of tip member 22 is a clamping means 24 which is slidably disposed on shaft 21. Preferably, clamping means 24 includes a sleeve 36 with an outwardly directed flange 37 at the forward end thereof. Flange 37 may be an integral part of sleeve 36 or a washer welded or soldered to sleeve 36. In any event, sleeve 36 and flange 37 are rigidly connected to each other. Collar 38 slides over sleeve 36 with a shank portion 39 extending toward flange 37 and a ring portion 40 forming a seat for compression spring 41. Spring stop 42 is rigidly attached to sleeve 36 by welding or soldering or other means after spring 41 is positioned on clamping means 24. Flange 37 has a small passageway 43 therethrough, generally parallel to the long axis of shaft 21, and of a size to permit ball stop 45 at rearward end 44 of cable 25 to pass through. The positioning of passageway 43 is such that when shank 39 is pressed against flange 37, as shown in FIG. 6, ball stop 45 cannot pass through passageway 43. However, when collar 38 is pulled rearwardly in the direction of arrow 47 against the force of spring 41 to withdraw shank 39 away from flange 37, as shown in FIG. 7, ball stop 45 will easily pass through passageway 43 in either direction of arrow 46. Once ball stop 45 is inserted through passageway 43, as shown in FIG. 7, and spring 41 is released, shank 39 will press against flange 37, allowing cable 25 to be pulled in either direction with some difficulty, but will not permit ball stop 45 to pass through passageway 43, thus fastening it to clamping means 24.

It is preferable that sleeve 36 move freely on shaft 21, when cable 25 is pulled through passageway 43 in flange 37 and it is positioned against the outwardly extending shoulder 34 of tip member 22, so that the tip portion 23 is maintained in its position on the forward portion 22' of tip member 22. The collar 38 includes a shank 39 and a spaced ring portion 40 with an inclined portion 38', having an angle of inclination of about 45°, so that the cable 25 is forcibly bent between passageway 43 and ring 40 which causes a frictional engagement therebetween which inhibits cable 25 from readily passing through clamping means 24. This provides sufficient frictional force on the cable 25 so that tip portion 23 is held onto tip member 22 during shooting of the spear shaft 20. The positioning of flange 37 adjacent shoulder 34 of tip member 22 is preferred although the clamping means 24 will function if flange 37 were spaced rearwardly from shoulder 34 and sleeve 36 engaged same, i.e., clamping means 24 were rotated 180° from the manner illustrated in FIG. 1. The disadvantage may be that the forces tending to cause the tip portion 23 to fall off would be acting to move the cable 25 forwardly which may be sufficient to open collar 38 against the spring 41 to cause inadvertent passage of stop 45 through passageway 43.

Flexible cable 25 is about 16 inches in length and the length of shaft 20 may be 3–4 feet. Adjacent forward end 30 of cable 25 is a rearwardly directed sharp pointed barb 48 immovably attached by a coupler 48' to cable 25. Barb 48 is adapted to engage against the speared fish so as to permit shaft 20 and its tip 22 to become detached from extension tip portion 23 by action of the fish and/or the skin diver pulling on the spear 20, as more clearly understood from the description hereinafter with regard to FIGS. 9–12.

In FIGS. 2 and 3 the preferred attachment of the forward end 30 of cable 25 to tip portion 23 is depicted. The forward end portion 27 of tip portion 23 is press fitted into rearward end portion 29. An inclined transverse hole 31 of a diameter slightly larger than cable 25 is drilled through rearward end portion 29 to admit forward end 30 of cable 25 therethrough. The rearward end portion 29 has a reduced cavity 49 below the forward end portion 27. A larger transverse hole 33 is drilled through end 29 in general alignment with hole 31. Cable 25 is inserted through hole 31 and extended outward of hole 33 where the end is melted to form ball 32 which is smaller in diameter than hole 33 but larger than hole 31. Preferably hole 31 is angled so as to make cable 25 enter rearward portion 29 at an angle of less than 90° and thereby make cable 25 lie closely adjacent to and along shaft 21 for the purposes mentioned above.

Figure 11:
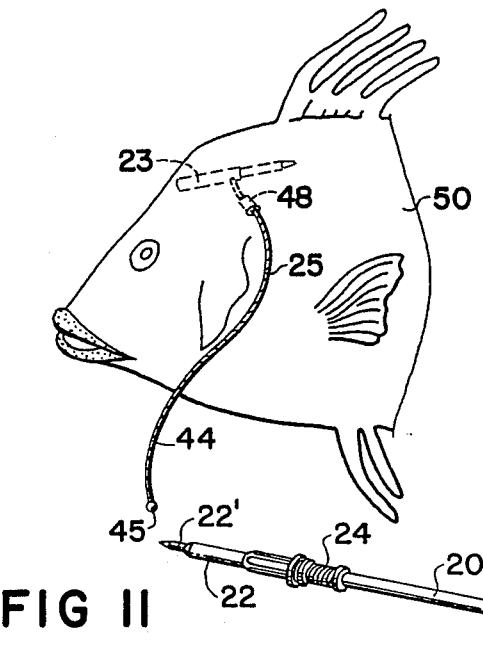
FIG. 11 is a schematic illustration of releasing the rearward end of the cable from the clamping means.
Figure 12:
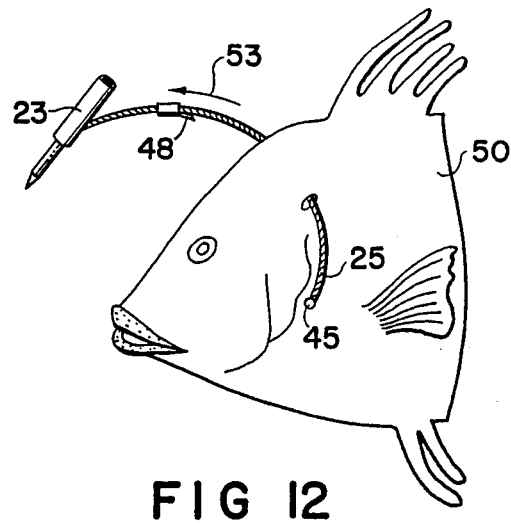
FIG. 12 is a schematic illustration of the final step in removing the extension tip member and cable from the fish.

In FIGS. 9–12 there are shown the steps of using the assembly and removing the extension tip portion 23 once a fish has been speared as shown in FIG. 9, with the tip assembly passing through the fish 50 in the direction of arrow 51. The spear shaft 20, including tip 22, is pulled rearwardly in the direction of arrow 52. Barb 48 catches on the far side of fish 50 and permits spear shaft 20 to be separated from extension tip portion 23 and pulled back through the hole in the fish 50. As seen in FIGS. 11 and 12, the extension tip portion 23 assumes a generally transverse position on the far side of the fish 50 to securely hold the fish 50 from dislodging the extension tip portion 23 or cable 25. In FIG. 11 the rearward end 44 of cable 25 is released from the clamping means 24 by pushing collar 38 against spring 41 and allowing ball stop 45 to be withdrawn through passageway 43 in flange 37. After cable 25 has been released from clamping means 24, cable 25 may be pulled through the fish 50 in the direction of arrow 53, as seen in FIG. 12, freeing tip 23 to be reassembled onto spear shaft 20 for another spear fishing shot.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A spear assembly for an underwater spear gun comprising an elongated shaft adapted to be fired from a spear gun and having a long axis, a forward end portion, and a rearward end portion, and a sharpened tip threadedly attached to said forward end portion, an elongated extension tip member having a sharp forward end and a rearward end including a rearwardly facing recess, said tip member being slideably and removably attachable to said sharpened tip by mating with said rearwardly facing recess in said extension tip member, an elongated flexible cable with a forward end attached to said extension tip member and a rearward end, and manually releasable clamping means slidable on the shaft for detachably securing thereto said cable.

2. The assembly of claim 1 wherein said cable includes a stop adjacent its said rearward end, said clamping means being adapted to release said stop when sid clamping means is selectively released.

3. The assembly of claim 2 wherein said clamping means includes a passageway through which said cable extends, said clamping means including a movable portion which reduces said passageway to permit passage of said cable and to inhibit passage of said stop.

4. The assembly of claim 2 wherein said movable portion of said clamping means is adapted to temporarily bend said cable to provide increased friction against cable movement through said passageway to inhibit said extension tip member from disengaging said tips during firing of a shaft from a spear gun.

5. The assembly of claim 1 wherein said forward end of said flexible cable is attached to a mid-portion of said tip member.

6. The assembly of claim 1 further comprising a rearwardly pointing barb affixed to said flexible cable adjacent said forward end of said cable, said barb being adapted to engage the far side of a speared fish to effect relative movement between a fish and said shaft to release said extension tip member from said shaft.

7. The assembly of claim 1 wherein said clamping means includes a rigid flange member having a passageway therethrough substantially parallel to said long axis and of a size to permit passage of said flexible cable therethrough, said cable having an enlarged stop adjacent its rearward end, said clamping means including a spring biased collar adjacent said passageway to selectively restrict disconnecting movement of said stop therethrough without materially impeding sliding movement of said cable in said passageway.

8. The assembly of claim 7 wherein said rigid member is affixed to a sleeve slidable upon a shaft of a spear, said collar being spring biased against said rigid flange member.

9. The assembly of claim 1 wherein said releasable clamping means includes a passageway through which said flexible cable extends.

10. The assembly of claim 9 wherein said passageway extends substantially parallel to said shaft.

11. The assembly of claim 10 wherein said releasable clamping means includes a laterally extending flange, said passageway extending through said flange, said cable having a stop adjacent its rearward end, said passageway being larger than said stop, said releasable clamping means including a spring biased collar adjacent said passageway to selectively restrict said passageway to inhibit passage of said stop therethrough without materially restricting free movement of said cable therethrough in the rearward direction longitudinally of a shaft and providing an increase in frictional resistance to said cable against movement of said cable in an opposite direction to inhibit removal of said extension tip member from said tip during firing of a shaft from a spear gun.

12. A spear assembly adaptable for use with an underwater spear gun, said spear assembly comprising an elongated shaft having a forward end portion and a selectively releasable clamping means mounted slidably on said forward end portion, a sharpened tip releasably attachable to said forward end portion, an extension sharpened tip member releasably attachable to said sharpened tip, and an elongated flexible cable with a forward end portion attached to said extension tip member and a rearward end portion, said clamping means being attached to said cable rearwardly of said forward end portion thereby, said extension tip member having a forward sharpened end and a rearward blunt end including a cup shaped recess for snugly receiving said sharpened tip therein, said forward end of said flexible cable being connected to said extension tip member generally medially between said sharpened and blunt ends, said clamping means having a passageway parallel to and laterally spaced from said shaft, said cable rearward end portion being slidable through said passageway, said cable rearward end portion having a stop thereon smaller than a lateral dimension of said passageway, said clamping means having a spring biased collar to selectively restrict said stop from passing through said passageway without substantially inhibiting sliding movement of said cable through said passageway.

13. The assembly of claim 12 wherein said collar temporarily bends said cable to provide increased friction against cable movement through said passageway in a forward direction and less friction against cable movement through said passageway in a rearward direction whereby said extension tip member is maintained on said tip during firing of said shaft from a spear gun.

14. The assembly of claim 12 wherein said collar includes a shank portion adjacent said passageway, an inclined portion extending laterally outwardly therefrom and a ring portion, said cable being in contact with an intersection between said inclined and ring portion, said cable being readily movable rearwardly and less readily forwardly toward said extension tip member.

15. The assembly of claim 14 wherein said clamping means includes a spring for biasing said collar toward said passageway.

16. The assembly of claim 12 further comprising barb means attached to said cable adjacent said forward end and having a sharp pointed prong facing rearwardly to engage a far side of a fish speared by said extension tip member and said forward end portions of said cable and shaft and tip to cause release of said extension tip member from said tip and shaft.

17. The assembly of claim 12 wherein said clamping means includes a sleeve slidably attached on said shaft and having a rigid flange portion extending laterally of said shaft, said clamping means including a collar spring biased toward said rigid flange portion with said passageway passing through said rigid flange portion, said collar when moved against said flange portion partially closing said passageway to a size less than the size of said stop.

18. The assembly of claim 12 wherein said stop is defined by a ball formed integrally onto a free end of said cable, said ball being released to pass through said passageway upon sufficient movement of said spring biased collar to a location to substantially unrestrict the free movement of said cable and stop through said passageway.

19. The assembly of claim 12 wherein said forward end of said flexible cable is formed with a ball at its end, said tip member having a hollow medial portion, another passageway passing generally transversely through said medial portion and communicating with its hollow, said another passageway adjacent one of its end portions through which said cable extends having a cross sectional dimension slightly greater than said cable but less than said ball whereby said cable is joined thereto to prevent loss of said extension tip member in repeated use of said assembly.

20. The assembly of claim 19 wherein said one end portion of said another passageway has an axis forming an acute angle with a longitudinal axis of said extension tip member whereby said ball is generally forwardly of said one end portion of said passageway adjacent an outer wall of said extension tip member whereby said cable is positioned closely and generally parallel to said tip member.

* * * * *